(12) United States Patent
Velez et al.

(10) Patent No.: US 6,384,571 B1
(45) Date of Patent: May 7, 2002

(54) METHOD OF RECHARGING A PYROTECHNICALLY ACTUATED THERMAL BATTERY

(75) Inventors: Thomas A. Velez, Huntsville, AL (US); Nicholas Shuster, Clearwater, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/921,021

(22) Filed: Aug. 2, 2001

Related U.S. Application Data

(60) Provisional application No. 60/228,266, filed on Aug. 25, 2000.

(51) Int. Cl.[7] ............................ H01M 10/44; H02I 7/04; H02I 7/16
(52) U.S. Cl. ........................ 320/101; 320/150; 429/62
(58) Field of Search ................................. 320/101, 150; 429/62

(56) References Cited

U.S. PATENT DOCUMENTS 3,898,101 A    8/1975   Bush et al. .................... 136/83

*Primary Examiner*—Gregory Toatley
(74) *Attorney, Agent, or Firm*—Marsh Fischmann & Breyfogle LLP

(57) ABSTRACT

The invention is a method of recharging a thermal battery after it has been activated and at least partially discharged and the battery is still at a temperature where the electrolyte is still active. The method comprises the step of at least partially recharging the battery prior to the battery temperature reaching a level where the electrolyte becomes non-active. The method optionally may include insulation or supplemental heater system about the thermal battery.

3 Claims, 1 Drawing Sheet

METHOD OF RECHARGING A PYROTECHNICALLY ACTUATED THERMAL BATTERY

RELATED APPLICATIONS

This application is a continuation-in-part of provisional patent application Serial No. 60/228,266 "Method Of Recharging A Pyrotechnically Actuated Thermal Battery", filed Aug. 25, 2000.

BACKGROUND OF THE INVENTION

1. Field of the Invention

The invention relates to the field of batteries and, in particular, to thermal batteries and methods of recharging such batteries.

2. Description of Related Art

Thermal batteries are noted for their extremely high discharge rate capability (high power delivered for short periods of time) and they generally have a very long storage life. A prior art thermal battery typically comprises of a plurality of cells, each comprised of a positive electrode and a negative electrode spaced apart by an inactive separator material containing an electrolyte that becomes ionically conductive when heated above the electrolyte melting point. A combustible material is disposed between the cells and in contact therewith for supplying heat to the electrolyte. The combustible material is typically a mixture of a finely divided oxidizer, such as potassium perchlorate, and a finely divided metal, such as iron powder. When activated by an external means, the combustible material will exothermically react to liberate a considerable amount of heat and sinter into an electronically conducting element between the cells. Thus this material contributes greatly to the weight of the battery. Upon ignition, the combustible material heats the electrolyte to a temperature wherein it melts. An explosive squib is used to initiate the combustion process.

At this point, the thermal battery will produce electrical power, generally for only a short period (at most seconds to minutes depending on the external load and thermal insulation design). Thus they have general application as a back-up power supply. In addition, they have application in non-emergency systems. On launch vehicles, weapons systems, and spacecraft there is often a need for large amounts of electrical energy for short periods. The weight of conventional batteries would be prohibitive. However, thermal batteries weighing as little as a few pounds provide more than adequate performance. An extreme example is that two fifty pound thermal batteries providing a nominal 270 volts and 450 amperes for three minutes can replace 2500 pounds of conventional lead acid batteries, in an application that might be used on the space shuttle. Typical thermal batteries are disclosed in U.S. Pat. No. 4,041,217 "Thermal Battery With Metal Oxide Heating Composition" By W. H. Collins and U.S. Pat. No. 3,898,101 "Thermal Battery" by D. M. Bush, et al.

As previously mentioned, such thermal batteries are usually short lived. Once the heat generating chemicals are exhausted, the battery begins to cool down. Over a rather short period of time, because of the cooling down, the electrolyte can become inactive even though a considerable amount of stored chemical energy may remain within the battery. However, many such batteries are drained of their charge, before the electrolyte becomes inactive. It is these later conditions that the subject method is directed at.

Thus, it is a primary object of the invention to provide a method of recharging a pyrotechnically activated thermal battery.

It is another object of the invention to provide a method of recharging a pyrotechnically activated thermal battery while the electrolyte within the battery is still active.

SUMMARY OF THE INVENTION

The invention is a method of recharging a thermal battery after it has been activated and at least partially discharged and the battery is still at a temperature where the electrolyte is still active. The method comprises the step of at least partially recharging the battery prior to the battery temperature reaching a level where the electrolyte is non-active. Additionally, a layer of thermal insulation may be placed about the battery. Furthermore, an electrical heating coil may also be placed about the battery to maintain the battery at operating temperatures.

The novel features which are believed to be characteristic of the invention, both as to its organization and method of operation, together with further objects and advantages thereof, will be better understood from the following description in connection with the accompanying drawings in which the preferred embodiment of the invention is illustrated by way of example. It is to be expressly understood, however, that the drawings are for purposes of illustration and description only and are not intended as a definition of the limits of the invention.

DESCRIPTION OF THE PREFERRED EMBODIMENT

Figure 1:
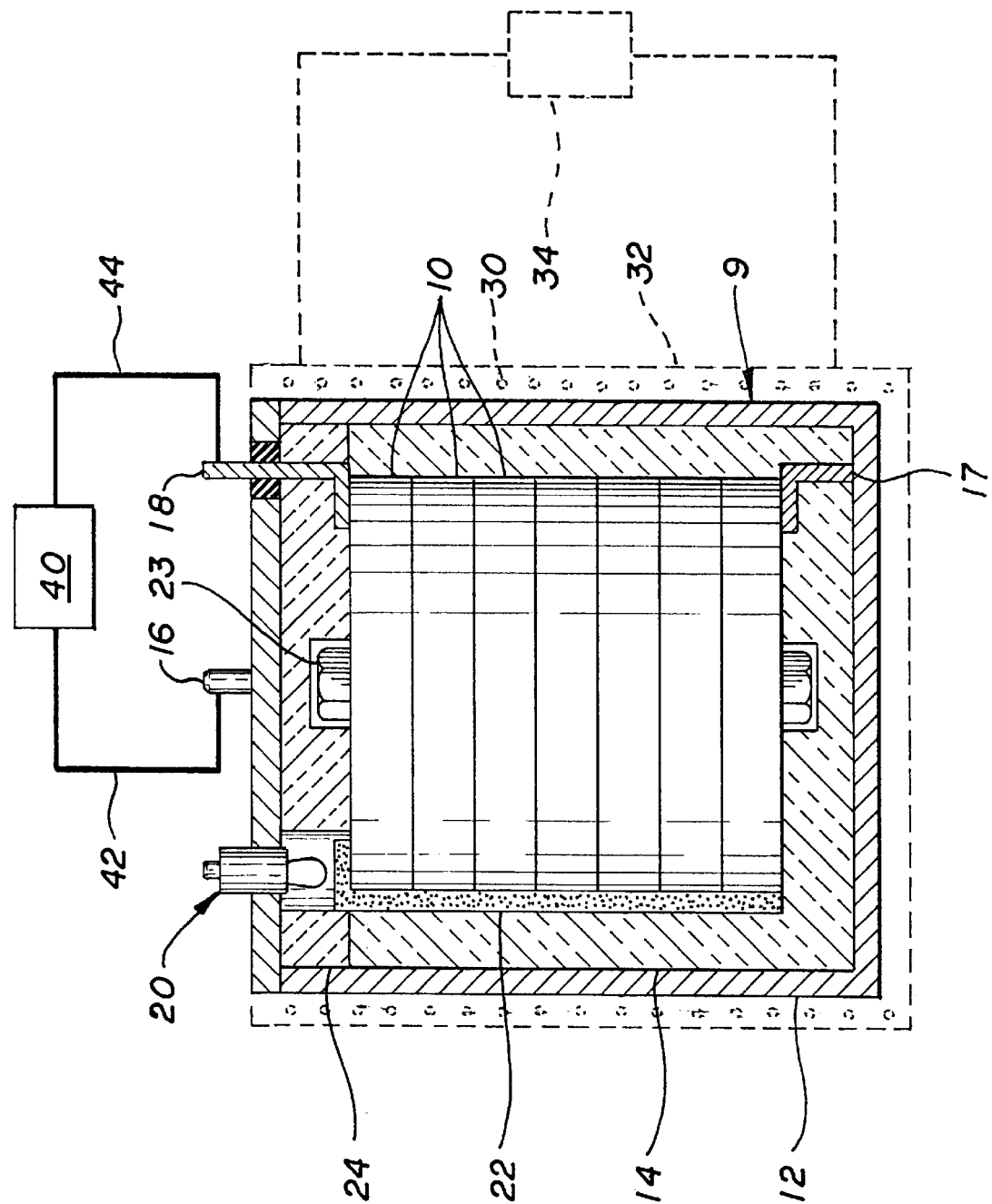
FIG. 1 is a cross-sectional of a typical thermal battery.

The subject method of recharging pyrotechnically actuated thermal batteries is most likely applicable to all such thermal batteries. Thus following is a brief description of the thermal battery disclosed in U.S. Pat. No. 3,898,101 "Thermal Battery" by D. M. Bush, et al. However, it must be reiterated that this selection is for purposes of illustration only. The thermal battery, generally indicated by numeral 9, may include a plurality of electrochemical cells 10 stacked one upon the other in electrical series within a suitable casing 12 and insulation barrier 14. Electrical connections may be made in an appropriate manner by suitable electrical leads and terminals 16, 17, and 18 to the respective positive and negative terminals of the upper and lower battery cells in the stack. The heat or thermal generating elements (not shown) for the battery, which are generally positioned as a part of each battery cell may be ignited to activate the battery by a suitable electrical match or detonator 20 and heat powder fuse 22 which is coupled between the detonator and the heating generating elements in each cell. The battery 9 is normally formed by first stacking the individual cell elements to form separate cells and then the cells are stacked together in the form shown in FIG. 1. They are then placed in the casing 12 and insulator barrier 14 under suitable pressure, such that by a compression force applied by bolt 23 passing through the center of the cells, or other suitable mechanisms. The so stacked battery cells may be then covered with an end insulator 24 and a casing 12 in an appropriate manner.

The battery 9 is operated by initiating the detonator 20 and in turn, the heat power fuse 22 and the individual heat generating elements of the cell stack and the electrical current is drawn off through leads 16, 17, and 18. The subject method is shown for recharging a thermal battery 9 after it has been activated and at least partially discharged with the battery still at a temperature wherein the electrochemical cells 10 are still active. The method comprises the step of at least partially recharging the battery prior to the battery temperature reaching a level wherein the electrochemical cells 10 become non-active. This is accomplished by activation of a battery charger 40 attached by wire leads 42 and 44 to leads 16 and 18. After the heating chemicals are exhausted, it may take as much as 30 minutes for the battery to cool to a temperature wherein the electrochemical cells 10 are no longer active. Thus in those instances where the thermal battery is rapidly discharged, it can be recharged. Additionally, a simple external thermal insulation blanket, shown in dotted lines and indicated by numeral 32) can be installed around the battery to retain heat there inside, thereby extending its operational lifetime (time at operational temperatures). Also, a simple external electrical wire heater assembly comprising a heating coil 34 and power supply 36, also shown in dotted lines can be installed to extend the operational lifetime of the battery.

Table 1 shows test results summary for successfully recharging a pyrotechnically actuated thermal battery. This was an off-the-shelf pyrotechnically activated thermal battery used in a JDAM missile manufactured by the Enser Corporation of Saint Petersburg, Fla. This battery used a Lithium Silicon anode and an Iron Disulfide cathode. The battery cells were 2.25 inches in diameter and the total battery module had a length of 6 inches and a weight of 1.6 Kgs. After pyrotechnic initiation, the battery began with an initial 101.2 closed circuit voltage (CCV); the discharge was held constant at 12.5 amps for approximately 120 seconds. The load was disconnected when battery voltage dropped to 93.6 CCV, yielding approximately 1.7 volts per cell. Recharge was accomplished at a 5 amps until battery voltage reached 107.5 open circuit volts (OCV) then battery voltage was held constant until the charge current stabilized. The load was then reapplied, yielding a 101.2 CCV for initiation of the second discharge cycle. Summary data from the first three discharge and recharge cycles are shown. During testing, the battery continued to cool down, to a non-operational internal temperature, during the latter part of the testing. Approximately 22 minutes after battery initiation, discharge/recharge cycle number 4 began and the battery voltage at end of that recharge dropped to 97.2 volts due to cool down. Several more cycles were then accomplished.

TABLE 1

RECHARGE TEST RESULTS SUMMARY

| Cycle | Toggle Voltage | Toggle Amp Hours/ kilogram | Toggle Watt Hours/ kilogram |
| --- | --- | --- | --- |
| Begin Test | 101.2 CCV | 0.00 | 00.3 |
| End Discharge #1 | 93.6 CCV | 0.29 | 28.6 |
| End Recharge #1 101.2 CCV | 107.5 OCV | 0.24 | 25.3 |

TABLE 1-continued

RECHARGE TEST RESULTS SUMMARY

| Cycle | Toggle Voltage | Toggle Amp Hours/ kilogram | Toggle Watt Hours/ kilogram |
| --- | --- | --- | --- |
| End Discharge #2 | 93.5 CCV | 0.08 | 08.0 |
| End Recharge #2 102.9 CCV | 106.2 OCV | 0.17 | 17.6 |
| End Discharge #3 | 93.4 CCV | 0.05 | 04.4 |
| End Recharge #3 100.3 CCV | 101.7 OCV | 0.16 | 16.4 |

Thus it can be seen that the pyrotechnically actuated thermal battery's operational life can be extended by the above method of recharging. There are numerous applications where such a capability would be desirable. For example where very high power cycles are required over a short period.

While the invention has been described with reference to a particular embodiment, it should be understood that the embodiment is merely illustrative, as there are numerous variations and modifications, which may be made by those skilled in the art. Thus, the invention is to be construed as being limited only by the spirit and scope of the appended claims.

INDUSTRIAL APPLICABILITY

The invention has applicability to the battery manufacturing industry. The invention also has applicability for aerospace vehicles and payloads therefore, such as launch vehicles and deep space payloads.

What is claimed is:

1. A method of recharging a thermal battery after it has been activated and at least partially discharged and the battery is still at a temperature where the electrolyte is still active, comprising the step of at least partially recharging the battery prior to the battery temperature reaching a level where the electrolyte becomes non-active.

2. The method as set forth in claim 1 including the additional step of installing thermal insulation about at least a portion of the thermal battery.

3. The method as set forth in claim 2 including the steps of:

installing a external heating assembly about the thermal battery; and operating the external heating assembly while charging and discharging the thermal battery.

\* \* \* \* \*